Feb. 23, 1932.  G. A. MONTGOMERY  1,846,348
TORSION AND COUPLING CONTROLLING DEVICE
Filed July 1, 1927
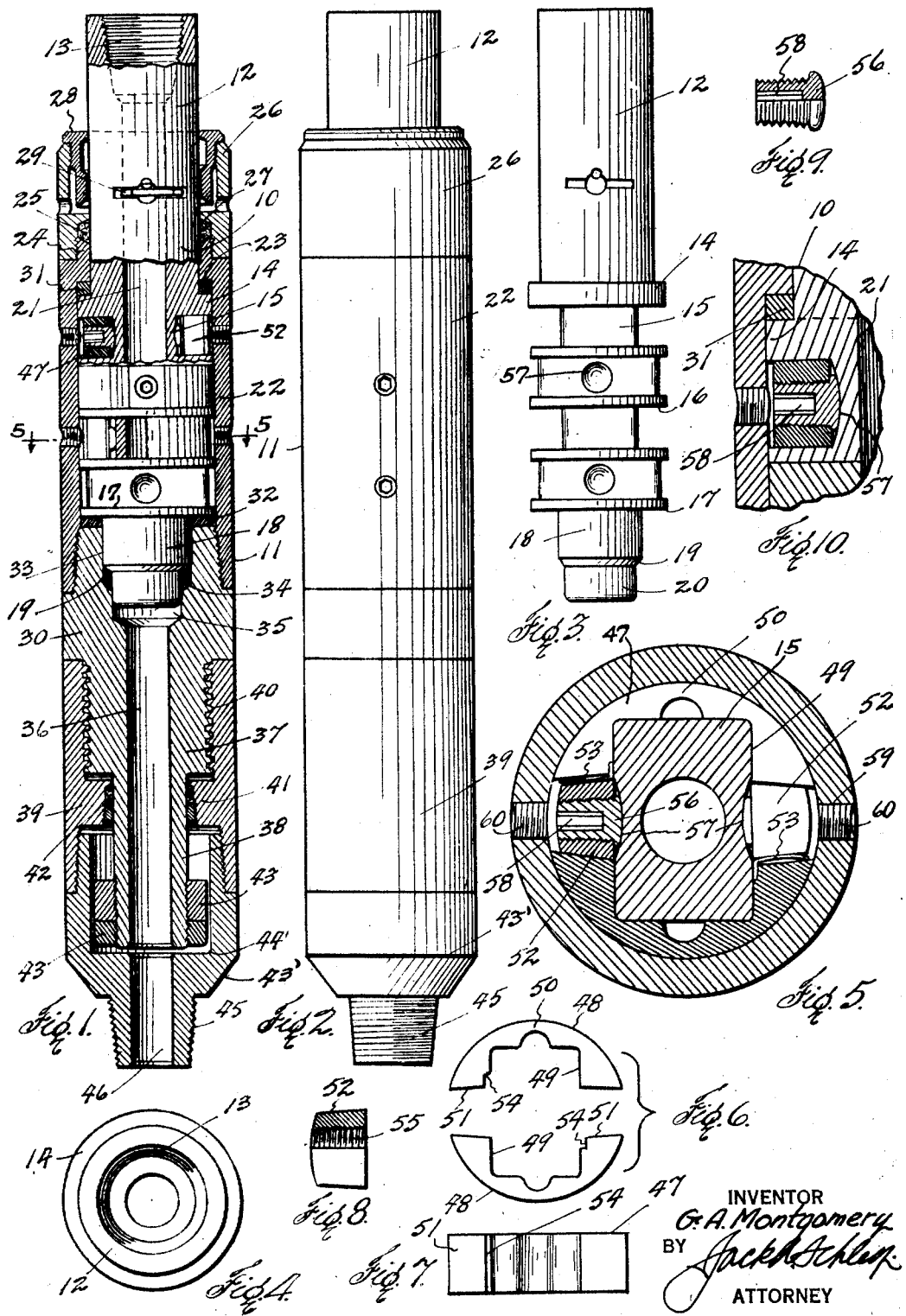
INVENTOR
G. A. Montgomery
BY Jack H. Schlein
ATTORNEY Patented Feb. 23, 1932

1,846,348

UNITED STATES PATENT OFFICE

GUSTAVUS A. MONTGOMERY, OF DALLAS, TEXAS

TORSION AND COUPLING CONTROLLING DEVICE

Application filed July 1, 1927. Serial No. 202,791.

This invention relates to new and useful improvements in torsion and coupling controlling devices for well drill stems.

The object of the invention is to provide certain improvements in torsion and coupling controlling devices such as are illustrated in my co-pending application, Serial No. 201,077 filed June 24, 1927.

A particular object of the invention is to provide a device of the character described equipped with means for contributing rotary motion from the driving member to the driven member and including expanding clutch members maintaining frictional contact until the torsion of the drill stem overcomes the static friction.

Another object of the invention is to provide means whereby the friction clutch members may be individually adjusted to vary the static frictional contact with the driven member, thus enabling the operator to set the device to yield at any predetermined point at which it may be desired to have the driving member rotate independently of the driven member.

Another object of the invention is to provide a plurality of radial clutching members subject to independent adjustment, whereby a very flexible and yet positive frictional clutching device is provided.

A still further object of the invention is to provide, in conjunction with the radial clutching members, a pair of friction rings taking the end thrust of the driving and driven members and co-acting with the clutching members in setting up a static friction to be overcome by the torsion of the drill stem.

A construction designed to carry out the invention will be hereafter described, together with other features of the invention.

The invention will be more readily understood from a reading of the following specification and by reference to the accompanying drawings, in which an example of the invention is shown and wherein:

Fig. 1 is a vertical sectional view of a device constructed in accordance with the invention, Fig. 2 is an elevation of the same, Fig. 3 is an elevation of the driving member, Fig. 4 is a plan view of the same, Fig. 5 is an enlarged horizontal cross-sectional view taken on the line 5—5 of Fig. 1, Fig. 6 is a plan view showing two of the clutching shoes in their operative relation.

Fig. 7 is an elevation of one of said shoes,

Fig. 8 is a detail of one of the wedges,

Fig. 9 is a detail of one of the adjusting screws, and

Fig. 10 is an enlarged detail showing one of the expanding wedges in position.

In the drawings the numeral 10 designates a driving member and 11 a driven member. The driving member is tubular and includes at its upper end a cylindrical shank 12 having a tapered screw-threaded socket 13 at its upper end and an outwardly directed collar 14 at its lower end. Below the collar are arranged a plurality of rectangular core blocks 15 disposed at right angles to each other and separated by circular horizontal flanges 16.

The blocks are integral with the shank and collar and a bottom circular flange 17 separates the bottom block from an axial bushing 18. The bushing has a beveled annular shoulder 19 surrounding a reduced pin 20 on the extreme lower end of the driving member. The driving member has an axial bore 21 extending therethrough for conducting the mud-laden or other fluids.

The driven member 11 includes a cylindrical barrel 22 surrounding the flanges 16 and blocks 15 and having an annular internal shoulder 23 overhanging the collar 14. The barrel has its upper end reduced so as to have a turning fit on the shank 12 above the collar and terminates in a threaded gland flange 24. The upper edge of the flange is cupped to receive a packing ring 25. A cap ring 26 is screwed onto the flange 24 and is provided with an internal annular shoulder 27 engaging and compressing the packing ring. This packing ring serves to prevent sand and other foreign matter entering therebelow and cutting out the parts.

A gong 28 is screwed into the upper end of the cap ring and a striking lever 29 is mounted in the shank 12. As these parts 28 and 29 are fully set forth and claimed in my co-pending application, Serial No. 201,077, filed June 24, 1927, they of course form no part of this invention and further description of the same is considered unnecessary. However, it is to be understood that this gong or any other signal means suitable for the purpose may be used if desired.

Into the bottom of the barrel is screwed the upper reduced end of a plug 30 having its outer surface flush with the barrel. A friction ring or washer 31 supported on the collar 14 is engaged by the shoulder 23 and a similar ring or washer 32 supported on the upper end of the plug is engaged by the flange 17. It will be seen when the plug is tightened the washers will be frictionally engaged with the driving and driven members, thus taking the relative end thrust thereof and also setting up a certain amount of statical friction to resist indepedent rotation of said members.

In the upper end of the plug is formed a central cylindrical packing box 33 for receiving a packing ring 34 to be compressed by the shoulder 19 of the bushing 18 when the latter is received in said box. An axial reduced sump 35 is formed below the box for receiving the pin 20. An axial bore 36 extends from the sump down through a shank 37 and a stem 38 formed on the plug.

For taking up back-lash in the drill stem a coupling 39 is provided and this coupling is formed with an internally screw-threaded socket 40 for receiving the screw-threaded shank 37 of the plug 30. The coupling has an annular internal collar 41 snugly receiving the stem 38 of the shank. A packing ring 42 seated in the collar embraces the stem.

A pair of nuts 43 on the lower end of the stem limit the unscrewing and downward movement of the coupling. A nipple 43' screwed into the bottom of the coupling has a chamber 44' for receiving the nuts when the coupling is screwed up. A screw-threaded pin 45 is provided on the bottom of the nipple for screwing into the drill stem (not shown). An axial bore 46 extends through the nipple and with the bores 36 and 21 provides a continuous fluid conduit through the center of the device. The packing ring 34 and the packing ring 42 provide against leaks and the loss of pressure by the drilling fluid.

The particular feature of the invention is the means for contributing rotary motion from the driving member 10 to the driven member 11, which means may be called a clutch. In the recesses surrounding the core blocks 15 I arrange curved friction shoes 47 which are shown in detail in Figs. 6 and 7, and which are formed of suitable metal having considerable resiliency. Each shoe has a continuous curved outer or clutching face 48, finished on an arc having substantially the same radius as the bore of the barrel 22 so as to frictionally contact therewith when urged into engagement with said barrel.

The shoes are arranged in pairs one on each end of each block. Each shoe has a central recess 49 for receiving one end of the block and is reduced at its center to form a hinge 50, whereby said shoe may be sprung or expanded. Diverging faces 51 are provided on the ends of the shoes at the sides of the blocks for receiving therebetween wedges 52, as is shown in detail in Figs. 8, 9 and 10. A bow spring 53 is seated in a notch 54 in each shoe; the spring of one shoe of a pair being on the opposite end to the spring of the complementary shoe of said pair. Each spring lies between one of the faces 51 and the wedge.

Each wedge has its larger end directed inwardly and is provided with a central screw-threaded opening 55 for receiving a round head adjusting screw 56. The head of the screw bears in a sump 57 in the side of the core block and has an axial wrench socket 58 extending inwardly from its outer end. The barrel 22 has screw-threaded openings 59 closed by plugs 60 and through which openings a suitable wrench (not shown) may be inserted into said sockets to adjust the screws, when the barrel is adjusted to bring said openings into registration with the screws.

It is obvious to those skilled in the art that upon turning the screws 56 in a clockwise direction the wedges 52 will be "backed off" or moved outwardly from the blocks 15, thus spreading the shoes 47, each of which will bend or swing on opposite sides of its hinge 50. By this adjustment the degree of static friction set up between the outer curved faces of the shoes and the inner wall or face of the barrel may be regulated, subject to the yielding compensation of the bow springs 53. The arrangement of one core block 15 at right angles to the next block is advantageous, because the driving member thus has greater strength and the strain is more equally distributed in both the driving and the driven members, but such an arrangement is subject to variation.

In drilling practice, the following would take place: The driller would feed the drill to the formation in his accustomed manner, and eventually crowd the drill so much that the resistance at the drill points equals the adjusted statical friction between the driving and driven members of the device. During this heavy torque on the drill pipe or stem, a definite proportional distortion has taken place in the drill pipe. In a long drill stem the twist or torque of the drill stem may amount to as much as a complete rotation or even more. Still, the distortion may be less than the force required to overcome the static friction limit. In other words, the drill pipe has a certain amount of "springiness". Suddenly the drill strikes a crevice in the formation, and the drill's rotation is immediately and violently arrested or stopped. The drill pipe having been under a maximum safe torque, continues to rotate in its upper part, but has become solidly seized by the drill at the lower end.

Remembering that the rotary machinery has excess of power over that required to twist off the drill pipe, it follows that as soon as the drill stem becomes anchored at its lower end, and the full power of the rotary machinery continues to supply torsion to the upper end, the moment will come when either the drill stem will twist off or, as is here intended to happen, the friction surfaces of the shoes 47 will suddenly slip on the inner or clutching surface of the barrel 22, as will also happen between washers 31 and 32 and their engaging surfaces. Now, according to the laws of friction, the kinetic friction is appreciably less than the static friction. It is then natural that as soon as the friction members slip, the torque on the drill pipe is immediately halved or nearly so. At the moment of the beginning of the slippage, the drill stem has stored energy proportional to the torsional distortion within the elastic limit and exactly equal to the static friction of the mechanism.

As soon as slippage takes place, that fraction of the stored torsional energy which exceeds the kinetic friction of the contacting surfaces is immediately released, and manifests itself in a violent reversed rotation, which is greatest in the extreme upper end of the drill stem and gradually lessens until at the point where the lower stem becomes anchored, the reverse rotation is nil. When the stored energy has spent itself in back-lash the torsional distortion in the drill pipe becomes equal to kinetic friction in the friction mechanism. The rotary machinery may then continue to run without over-stressing the drill stem. However, as soon as slippage takes place the gong 28 is sounded.

Upon hearing the gong or otherwise observing that the friction members are slipping, it then becomes the duty of the driller to stop rotating and lift the drill from the well bottom. At the moment when the drill becomes released from its anchorage the residue of the stored torsional energy in the drill stem, which is equal to the kinetic friction in the friction mechanism, becomes released and is spent in a violent reverse turning, or as it is called by drillers, back-lash. This back-lash is at times so violent that by its momentum the loosest screwed together joint in the drill stem unscrews and drops into the well bore. To avoid such a calamity, the coupling 39 with the shank 37 and the socket 40 are provided. These parts have sufficient driving qualities when screwed up, but readily unscrew.

It will be seen that when the drill stem is lifted and the drill released, the coupling 39 will begin to unscrew from the shank 37. It is assumed that even the most violent back-lash or reverse rotation will be taken up before the nuts 43 engage the collar 41. The parts are so arranged that a sufficient number of threads will remain in mesh to support the pendant load. Upon releasing the bit and neutralizing the back-lash, the driller may renew boring by merely lowering the stem and drill into the bottom of the well. The unscrewing preventer is then screwed home by the rotary.

Various changes in the size and shape of the different parts, as well as modifications and alterations, may be made within the scope of the appended claims.

What I claim, is:

1. In a device of the character described, a driving member having a coupling for attachment in a drill stem, a driven member having a coupling for attachment in a drill stem, one of said members being formed with an axial seat and the other member having an end thrust bearing in said seat, and friction clutch shoes rotatably carried by one of said members and engaging with the other member.

2. The combination as defined in claim 1, and adjusting means engaging the shoe carrying member and the shoes for regulating the frictional contact of the shoes with the other member.

3. In a device of the character described, a driving member for attachment in a drill stem, a driven member for attachment in a drill stem, friction clutch shoes mounted upon core-blocks intermediate flanges carried by one of said members and engaging with the other member, and friction elements interposed between the end flanges and the face of the other member for resisting independent rotation thereof upon slipping of said shoes.

4. In a device of the character described, a driving member for attachment in a drill stem, an enclosing driven member for attachment in a drill stem and provided with an end thrust bearing for the driving member, parallel flanges upon the driving member, segmental clutching shoes disposed between said flanges and slidably engaging the core of the driving member, and expanding means disposed between said shoes and engaging said core for frictionally adjusting the shoes into contact with the driven member.

5. The combination defined by claim 4, and resilient means disposed between the expanding means and said shoes.

6. In a device of the character described, a driving member for attachment in a drill stem, a driven member for attachment in a drill stem and fitting over the driving member, radial clutching shoes slidably mounted upon a core block intermediate flanges upon the driving member and engaging with the driven member, and adjustable means interposed between the shoes and engaging said core for expanding them into frictional contact with the driven member.

7. In a device of the character described, a driven member for attachment to a drill stem and having a barrel, a driving member having a portion extending through the said barrel, friction shoes slidably supported upon the driving member for engagement with the inner wall of the barrel, and wedges engaging the driving member and interposed between the shoes for urging them into contact with the barrel.

8. In a device of the character described, a driven member for attachment to a drill stem and having a barrel, a driving member having a portion extending through the said barrel, friction shoes carried by the driving member for engagement with the inner wall of the barrel, wedges interposed between the shoes for urging them into contact with the barrel, and washers at each end of the barrel having frictional engagement with the driving member.

9. In a device of the character described, a driven member for attachment to a drill stem and having a barrel, a driving member engaging in the driven member and having a plurality of core blocks within said barrel, friction shoes arranged in pairs on each side of each block, and wedges between the ends of each pair of shoes for urging them into frictional contact with the barrel.

10. In a device of the character described, a driven member for attachment to a drill stem and having a barrel, a driving member engaging in the driven member and having a plurality of core blocks within said barrel, friction shoes arranged in pairs on each side of each block, wedges between the ends of each pair of shoes for urging them into frictional contact with the barrel, and screws in said wedges engaging said block for adjusting the wedges to expand the shoes.

11. In a device of the character described, a driven member for attachment to a drill stem and having a barrel, a driving member engaging in the driven member and having a plurality of core blocks within said barrel, friction shoes arranged in pairs on each side of each block, wedges between the ends of each pair of shoes for urging them into frictional contact with the barrel, screws in said wedges engaging said blocks for adjusting the wedges to expand the shoes, and a spring interposed between each wedge and one of the shoes for yieldably sustaining said shoe.

12. In a device of the character described, a driving member for attachment in a drill stem, a driven member for attachment in a drill stem, a core block upon the driving member intermediate parallel flanges, friction clutch shoes embracing said block and engaging the driven member, friction elements interposed between the end flanges and the face of the driven member, a packing supported upon a threaded flange from the driven member above said shoes, and a cap upon the threaded flange to compress said packing into contact with the driving member.

In testimony whereof I affix my signature.
GUSTAVUS A. MONTGOMERY.